US009670339B1

(12) United States Patent
Dziwok et al.

(10) Patent No.: US 9,670,339 B1
(45) Date of Patent: *Jun. 6, 2017

(54) PROCESS OF MANUFACTURING THICKENERS AND THE USE OF THUS PRODUCED THICKENERS IN HIGH-VISCOSITY EPOXY RESIN FORMULATIONS

(71) Applicants: BYK-Chemie, GmbH, Wesel (DE); BYK USA, Inc., Gonzales, TX (US)

(72) Inventors: Klaus Dziwok, Freilassing (DE); Helmut Coutelle, Freising (DE); Robert G. Briell, Seguin, TX (US); Tyler Nash, Dale, TX (US)

(73) Assignee: BYK USA Inc., Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,447

(22) Filed: Nov. 18, 2016

(30) Foreign Application Priority Data

Jun. 22, 2016 (EP) .................................... 16175824

(51) Int. Cl.
*C08K 9/04* (2006.01)
*C08K 5/19* (2006.01)
(Continued)

(52) U.S. Cl.
CPC .............. *C08K 9/04* (2013.01); *C08J 3/203* (2013.01); *C08K 3/346* (2013.01); *C08K 5/19* (2013.01); *C08J 2363/02* (2013.01)

(58) Field of Classification Search
CPC ... C08K 9/04; C08K 3/346; C08K 5/19; C08J 3/203
See application file for complete search history.

(56) References Cited

U.S. PATENT DOCUMENTS 3,252,757 A 5/1966 Granquist
3,348,778 A 10/1967 Cohn et al.
(Continued)

FOREIGN PATENT DOCUMENTS

EP 0 220 346 A1 5/1987
EP 0 835 910 A1 4/1998
(Continued)

OTHER PUBLICATIONS

Chemeda, Yadeta C., et al. "Rheological properties of palygorskite-bentonite and sepiolite-bentonite mixed clay suspensions," Applied Clay Science, vol. 90., 2014, pp. 165-174.
(Continued)

*Primary Examiner* — John Uselding
(74) *Attorney, Agent, or Firm* — Curatolo Sidoti Co., LPA; Joseph G. Curatolo; Salvatore A. Sidoti (57) ABSTRACT

The invention relates to the use of at least one mixed mineral organoclay rheology additive in a liquid composition comprising at least one epoxy resin, the additive comprises or consists of a quaternary alkyl-ammonium salt treated mineral clay mixture prepared by forming an aqueous hormite clay slurry (a), forming an aqueous smectite clay slurry (b), combining the aqueous hormite clay slurry (a) with the aqueous smectite clay slurry (b) to form a combined clay slurry (c), treating the combined clay slurry (c) with one or more quaternary alkyl-ammonium salts, and separating the produced quaternary alkyl-ammonium salt treated mineral clay mixture from the aqueous medium. The invention also relates to a process for producing a mixed mineral organoclay rheology additive and the use of the thus produced additive as a thickening agent in liquid compositions.

20 Claims, 2 Drawing Sheets (51) Int. Cl.
*C08K 3/34* (2006.01)
*C08J 3/20* (2006.01)

(56) References Cited

U.S. PATENT DOCUMENTS

| | | |
|---|---|---|
| 3,586,468 A | 6/1971 | Sims et al. |
| 3,666,407 A | 5/1972 | Orlemann |
| 3,671,190 A | 6/1972 | Neumann |
| 3,844,978 A | 10/1974 | Hickson |
| 3,844,979 A | 10/1974 | Hickson |
| 3,852,405 A | 12/1974 | Granquist |
| 3,855,147 A | 12/1974 | Granquist |
| 4,842,073 A | 6/1989 | Himes et al. |
| 5,800,157 A | 9/1998 | Hasse et al. |
| 5,837,654 A | 11/1998 | Carroll et al. |
| 6,036,765 A | 3/2000 | Farrow et al. |
| 6,328,106 B1 | 12/2001 | Griffith et al. |
| 6,534,570 B2 | 3/2003 | Farrow et al. |
| 6,635,108 B1 | 10/2003 | Farrow et al. |
| 8,389,447 B2 | 3/2013 | Dino et al. |
| 2007/0197403 A1 | 8/2007 | Dino et al. |
| 2010/0310878 A1 | 12/2010 | Hofstetter et al. |

FOREIGN PATENT DOCUMENTS

| | | |
|---|---|---|
| EP | 1141071 A2 | 10/2001 |
| EP | 2 085 426 A1 | 8/2009 |
| WO | WO 97/17398 | 5/1997 |
| WO | WO 2015/138407 A1 | 9/2015 |

OTHER PUBLICATIONS

European Search Report in corresponding EP 16175824.8, mailed Dec. 8, 2016.

Crosa, Mario, et al., "Determination of Mean Crystallite Dimensions From X-Ray Diffraction Peak Profiles; A Comparative Analysis of Synthetic Hematites", Clays and Clay Minerals, Dec. 1, 1999, pp. 742-747, vol. 47, No. 6, The Clay Minerals Society.

Rytwo, Giora, et al., "Adsorption of Monovalent Organic Cations on Sepiolite: Experiemental Results and Model Calculations", Clays and Clay Minerals, 1998, pp. 340-348, vol. 46, No. 3, The Clay Minerals Society.

Shariatmadari, H., et al., "Sorption of Selected Cationic and Neutral Organic Molecules on Palygorskite and Sepiolite", Clays and Clay Minerals, 1999, pp. 44-53, vol. 47, No. 1, The Clay Minerals Society.

PROCESS OF MANUFACTURING THICKENERS AND THE USE OF THUS PRODUCED THICKENERS IN HIGH-VISCOSITY EPOXY RESIN FORMULATIONS

The present invention relates to a process of manufacturing specialized thickeners and the use of thus produced thickeners in high-viscosity epoxy resin formulations. The invention particularly relates to the use of the thus produced thickeners in modifying the rheology of non-aqueous formulations like epoxy resin formulations.

TECHNOLOGICAL BACKGROUND

In particular in the field of adhesives, sealants, coating agents and molding compounds as well as non-aqueous based oil-drilling fluids and the like, it is necessary to customize the rheological properties of such systems, primarily through adjusting the consistency by the selection of binding agents, solvents and the concentration of pigments and/or fillers. However, in many cases an adjustment to the desired consistency with the help of the aforementioned components is not sufficient. In such cases, the addition of so-called rheology additives (i. e. rheological additives) is required. The effect of this can be lowering the viscosity for the purpose of better processability or an increase in viscosity, which in the present invention is referred to as "thickening."

Many different organic or inorganic thickeners are described for the purposes cited.

Commonly used in aqueous systems are cellulose ether, starch, natural hydrocolloids, synthetic biopolymers, polyacrylate thickeners, associative thickening agents based on hydrophobically-modified polymers such as polyethers, ether urethanes, polyacrylamides and alkaline activated acrylate emulsions or water swellable inorganic thickeners.

Typical rheology additives for non-aqueous systems include, in addition to organic thickeners such as waxes and thixotropic resins, inorganic thickeners such as, for example, magnesium oxide and magnesium hydroxide or amorphous silica and layered silicates.

Among layered silicates, clay materials are often used as thickeners; among these, organically modified clay materials (also known as organoclays) are used in the art.

Organoclays are widely used as thickeners, more specifically thixotropes, for organic solvents or organic coatings systems like paints and varnishes and in composites as well. They are typically used in an additive amount, i.e. an amount of 10% by weight or less to improve the application properties of liquid organic systems. Such thickened organoclay containing liquid organic systems show thixotropic or pseudoplastic behavior. This improves the storage stability of organic systems. It prevents the demixing and especially the sedimentation of pigments and fillers in the system during storage. It keeps the organic systems homogeneous.

A further purpose for which the organoclays are used is to increase the sag resistance of liquid organic systems. Typically paints which are applied to vertical surfaces tend to run down and cause drop formation on the substrate. The paints can only be applied in a certain limited film thickness before they start running down or start dropping. This is usually called "sagging". Organoclays can reduce sagging by increasing the viscosity of the system. The increase in viscosity can be regarded as a gelling of the systems within a time frame of seconds to minutes.

The way the organoclays are doing this is mostly referred to as a house of cards structure. The organoclay is made out of clay minerals in form of platelets or in form of needle-like pseudo laminar structures. The clay platelets at rest are supposed to orientate themselves in a shape similar to a house of cards. This house of cards has a certain stability which provides the gelling and anti-sagging properties. But when moved during application by painting, spraying and the like, this house of cards breaks down and only low apparent viscosity is visible during application. After application, when there is no strong external force on the liquid, this house of cards recovers within seconds to minutes and gives viscosity in form of gelling at low shear forces. This can be measured by means of a rheometer especially when the viscosity is monitored at low shear forces, i. e. low speed of the rotating part of the rheometer. That means organoclays do not increase the apparent viscosity of the liquid system too much during application, but gel formation occurs very quickly after the application due to the strong low shear viscosity input.

Organoclays typically are made from inorganic clays. Natural clay is usually only badly compatible with solvents. Typically it is hydrophilic and mainly suspendable in water, less in most organic solvents. Therefore the surface of the clay mineral has to be rendered hydrophobic. This is done by an organic coating of the clay surface. The clay mineral is typically anionically charged. The most common method is to treat the anionic clay with cationic surfactants, namely quaternary ammonium salts. Both educts are typically reacted in water. The quaternary ammonium goes to anionic charges on the clay surface and gives a strong bonding to these charges. The clay surface is rendered hydrophobic at that point and the clay loses water solubility. The thus modified clay is usually suspendable in organic solvents, but less in water.

WO-A-97/17398 and U.S. Pat. No. 6,036,765 disclose mixtures of clays that were surface-treated with quaternary alkyl-ammonium salts and which comprise about 50 to 95% by weight, in relation to the layered clay mixture, of a clay mineral selected from the group consisting of sepiolite and/or palygorskite and contain less than 50% by weight, in relation to the layered clay mixture, of at least one smectite. The smectite or smectites can preferably be selected from the group consisting of hectorite, montmorillonite, bentonite, beidelite, saponite, stevensite and mixtures thereof. None of both publications describes the use of hormite clays having an extraordinary low content of specific metal oxides namely aluminum oxide and/or iron oxide in the manufacture of the therein produced rheology agents.

U.S. Pat. No. 8,389,447 B2 describes organoclay additives to provide oil well drilling fluids with less temperature dependent rheological properties. The additives disclosed therein are based on a synergistic combination of a hectorite organoclay composition and an attapulgite organoclay composition. Each of both clays was treated with at least two different quaternary ammonium salts one of which has to be an alkoxylated quaternary ammonium salt before the thus treated clays were mixed.

WO 2015/138407 A1 also describes mixtures of preformed organophilic modified attapulgite and/or sepiolite clays with preformed organophilic modified bentonite clay for use in oil-based drilling fluid base compositions. However, in contrast to WO-A-97/17398 and U.S. Pat. No. 6,036,765 the most preferred amount of the modified attapulgite/sepiolite in the mixture with the modified bentonite is very low and in the range of about 10% by weight, only.

The thickeners described in the prior art seem to have an average to good performance in the systems they were used in. However there is still a need to provide an improved process of manufacturing thickeners. Using the thus produced thickeners should lead to very reliable and mostly significantly increased thickening effects particularly in specific application systems such as epoxy resin formulations which are widely used, e. g. in coatings, sealants and adhesives.

In the storage form of epoxy resin containing liquid compositions, hardeners are typically not contained. Typically one or more hardeners are mixed with or into such liquid compositions only shortly before the application to form a ready-to-use formulation. After mixing the hardener with or into the liquid epoxy resin containing compositions a curing reaction between epoxy resin and hardener occurs. This reaction is usually exothermic, resulting in an increase of temperature. The initial increase of temperature is usually associated with a decrease of viscosity of the formulation. However at a later stage, when curing has proceeded, viscosity will start to increase again, due to the formation of larger molecules formed in the reaction between epoxy resin and hardener. Therefore the initial decrease in viscosity after the start of the reaction of the epoxy resin with its hardener demands an extraordinarily high performance of the thickener used. By any means, it needs to be avoided that the initial decrease of viscosity of the ready-to-use formulation leads to undesired sagging and the like. With other words the increase in viscosity by adding the thickener to the hardener-free storage form should already be excellent.

In summary, it was the aim of the inventors of the present invention to provide an improved process of manufacturing thickeners and the use of the thus produced thickeners in liquid epoxy resin formulation. It was a further aim of the inventors to provide a very reliable process of producing an organoclay based rheology additive with a higher performance compared to structurally related organoclay additives known from the state of the art.

SUMMARY

The before mentioned goals were achieved by providing a process of manufacturing a mixed mineral organoclay rheology additive, which comprises or consists of a quaternary alkyl-ammonium salt treated mineral clay mixture, the process being characterized by
i. forming an aqueous hormite clay slurry (a)
ii. forming an aqueous smectite clay slurry (b)
iii. combining the aqueous hormite clay slurry (a) with the aqueous smectite clay slurry (b) to form a combined clay slurry (c)
iv. treating the combined clay slurry (c) with one or more quaternary alkyl-ammonium salts and
v. optionally separating the thus produced quaternary alkyl-ammonium salt treated mineral clay mixture from the aqueous medium,
in which
the aqueous hormite clay slurry (a) being formed by
(i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$,
and
the aqueous smectite clay slurry (b) being formed by
(ii.1) dispersing a fraction of one or more smectite clays in an aqueous medium to form a dispersion,
and
in that the weight of the hormite clay content exceeds the weight of the smectite clay content in the combined clay slurry (c); and
subjecting the dispersions formed in (i.1) and (ii.1) to high speed fluid shear before carrying out step iii. and/or after having carried out step iii.

The above process of manufacturing a mixed mineral organoclay rheology additive, which comprises or consists of a quaternary alkyl-ammonium salt treated mineral clay mixture is herein also called "process according to the invention".

A further object of the present invention is the use of at least one of the mixed mineral organoclay additives obtained by the process according to the present invention as thickener in liquid compositions, preferably non-aqueous liquid compositions.

The mixed mineral organoclay rheology additives as produced according to the present invention are particularly suitable for thickening liquid compositions comprising at least one epoxy resin. It was also confirmed that the thus produced additives are not only apt to provide a superior viscosity to epoxy based formulations, but also to other preferably non-aqueous systems like organic solvents, epoxy resin free liquid organic compositions as e. g. non-epoxy based coating materials, adhesives and sealants as well as organophilic oil and/or gas drilling fluids or thermoplastic moulding compounds and reinforced thermoplastic composites and the like. Therefore, beside their superior properties in thickening liquid epoxy resin compositions the additives as produced according to the present invention provide an excellent thickening effect to other liquid organic formulations, too. The use as thickener or more specifically as thixotroping agent in such liquid formulations is also object of the present invention.

DETAILED DESCRIPTION

Manufacture of the Mixed Mineral Organoclay Rheology Additives According to the Process of the Invention One primary object of the present invention is to provide a process of manufacturing the mixed mineral organoclay additive, which comprises or consists of a quaternary alkyl-ammonium salt treated mineral clay mixture. The process being characterized by:
i. forming an aqueous hormite clay slurry (a)
ii. forming an aqueous smectite clay slurry (b)
iii. combining the aqueous hormite clay slurry (a) with the aqueous smectite clay slurry (b) to form a combined clay slurry (c)
iv. treating the combined clay slurry (c) with one or more quaternary alkyl-ammonium salts and
v. optionally separating the thus produced quaternary alkyl-ammonium salt treated mineral clay mixture from the aqueous medium,
in which
the aqueous hormite clay slurry (a) being formed by
(i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$, and the aqueous smectite clay slurry (b) being formed by (ii.1) dispersing a fraction of one or more smectite clays in an aqueous medium to form a dispersion, and in that the weight of the hormite clay content exceeds the weight of the smectite clay content in the combined clay slurry (c); and subjecting the dispersions formed in (i.1) and (ii.1) to high speed fluid shear before carrying out step iii. and/or after having carried out step iii.

In a first embodiment of the above general process of manufacturing the mixed mineral organoclay additive, which comprises or consists of a quaternary alkyl-ammonium salt treated mineral clay mixture, the following steps are carried out:

i. forming an aqueous hormite clay slurry (a)

ii. forming an aqueous smectite clay slurry (b)

iii. combining the aqueous hormite clay slurry with the aqueous smectite clay slurry to form a combined clay slurry (c)

iv. treating the combined clay slurry (c) with one or more quaternary alkyl-ammonium salts v. optionally separating the thus produced quaternary alkyl-ammonium salt treated mineral clay mixture from the aqueous medium, in which the aqueous hormite clay slurry (a) being formed by (i.1) dispersing a fraction of one or more hormite clays selected from the group of sepiolites and palygorskites in an aqueous medium, preferably water to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$, (i.2) optionally screening the dispersion formed in (i.1) through a 100 mesh screen to remove coarse particles, and (i.3) subjecting the dispersion formed in (i.1) or (i.2) to high speed fluid shear; the aqueous smectite clay slurry (b) being formed by (ii.1) dispersing a fraction of one or more smectite clays in an aqueous medium, preferably water to form a dispersion, (ii.2) optionally screening the dispersion formed in (ii.1) through a 100 mesh screen and/or centrifugalizing the dispersion formed in (ii.1) or the dispersion screened through a 100 mesh screen to remove coarse particles, and (ii.3) subjecting the dispersion formed in (ii.1) or (ii.2) to high speed fluid shear;

and in that the weight of the hormite clay content exceeds the weight of the smectite clay content in the combined clay slurry (c).

In the dispersion steps (i.1) and (ii.1) particle size reduction is achieved. It is particularly preferred to produce particle size distributions such that at least 90 weight-%, more preferred at least 95 weight-% of the particles pass through a 100 mesh screen based on the total weight of the clay in the respective slurry. This can e.g. suitably be achieved by using a dissolver device in dispersion steps (i.1) and (ii.1), e.g. a Cowles dissolver. The term "mesh" as used herein is used in accordance with the US standard mesh system. According to the US standard mesh system a 100 mesh screen has 149 μm mesh openings.

The use of a 100 mesh screen in the optional screening steps (i.2) and (ii.2) is to be understood as the use of an "at least 100 mesh screen". It is of course possible to even use mesh screens with smaller mesh openings than 149 μm. However, a 100 mesh screen is sufficient to prevent damage of devices used for further particle size reduction. Since the particles left on the screen are usually discarded, the use of finer screens than 100 mesh screens may however lead to an unnecessary loss of yield.

The dispersing steps (i.1) and (ii.1) can preferably be carried out as follows. First, a coarse grind of the respective raw clay fraction is prepared, which can be achieved by any conventional crushing, pulverizing or grinding means. The particles of the coarse grind, preferably, but not necessarily, have particle sizes less than 5 mm, more preferably less than 4 mm, as e.g. 2 to 3 mm, which can, if desired, be ensured by sieving the particles through an appropriate mesh screen. Subsequently, the coarsely grinded clay material is preferably added to an aqueous medium, preferably being water, the aqueous medium having a preferred temperature of about 45 to about 70° C., even more preferred of about 50 to about 65° C. and most preferred of about 55 to about 60° C. to form a clay suspension, i.e. a clay slurry. The water content of such slurry being typically in the range of 75 to 98 weight-%, more preferred 85 to 95 weight-% based on the total weight of the slurry. The resulting suspension is preferably agitated under high shear by any conventional dissolver as e.g. a dissolver with a Cowles blade (i.e. a Cowles dissolver). The high shear agitation time period is usually not less than about 30 min and ranges preferably from 0.5 to 2 h. The resulting suspension contains fine clay particles and may be further diluted with water, preferably warm water in the above mentioned temperature range, before optionally being screened through a 100 mesh screen. Such further diluted slurry having a water content typically being in the range of 90 to 99 weight-%, more preferred 92 to 97 weight-% based on the total weight of the slurry.

Although the particle size of the hormite and smectite clays in the hormite clay fraction and smectite clay fraction, respectively, is not particularly critical at this stage, it is preferred to remove coarse particles which do not pass a 100 mesh screen—i.e. to carry out steps (i.2) and (ii.2)—before subjecting the clay to any further homogenization, grinding and/or milling steps and the mandatory treatment with the quaternary alkyl-ammonium salts. Carrying out steps (i.2) and (ii.2) leads to dispersions which do not contain coarse particles and which therefore avoid damage of devices used for further particle size reductions such as e.g. mills, like a Manton-Gaulin mill. To facilitate steps (i.2.) and (ii.2) screening, i.e. sieving can be carried out by using a vibrating screen.

In case steps (i.2) and (ii.2) are carried out, the fine clay particles thus produced preferably have particles size distributions such that at least 90 weight-%, more preferred at least 95 weight-% of the total weight of the dissolver treated clay passes through the 100 mesh screen. The grit retained on the screen should preferably not exceed 10 weight-%, more preferred it should not exceed 5 weight.-% based on the total weight of the dissolver treated clay. The grit is discarded and only the finely grained 100 mesh screened clay fraction is used for further treatment. In most cases the amount of grit is less than 5 weight-%, mostly even less than 3 weight-% based on the total weight of the dissolver treated clay.

The inventors of the present invention have carried out analyses of the grit of several hormite clay fractions (i.e. the part which did not pass the 100 mesh screen) and found that the $Al_2O_3$ and $Fe_2O_3$ contents of the grit in conjunction with the low amount of grit do not significantly influence the $Al_2O_3$ and $Fe_2O_3$ contents of the hormite clay fraction that passes a 100 mesh screen. With other words the $Al_2O_3$ and $Fe_2O_3$ contents of the hormite clay fraction that passes the 100 mesh screen does not significantly differ from the $Al_2O_3$ and $Fe_2O_3$ content of the raw hormite clay fraction as mined and dried at 105° C. to constant weight as described above.

Even though it is sufficient for the present invention that the $Al_2O_3$ and $Fe_2O_3$ contents of the raw hormite clay fraction as mined and dried is within the ranges as required by the present invention, it is most preferred that the $Al_2O_3$ and $Fe_2O_3$ contents of the hormite clay fraction that passes the 100 mesh screen after having been treated as lined out above are also within the same ranges. The $Al_2O_3$ and $Fe_2O_3$ contents of the hormite clay fraction that passes the 100 mesh screen can be determined in the same way as described for the raw hormite clay as mined, with the only difference, that the screened suspension is dried to constant weight at a temperature of 105° C. before subjecting the clay to chemical extraction by means of hydrofluoric acid and hydrochloric acid.

In particular in case of the smectite clay fraction a further optional centrifugalizing step of the clay suspension which passed the 100 mesh screen can be employed as part of step (ii.2) to even further reduce the amount of larger particles in said suspension by separating and discarding the large particles.

The further reduction of size of the clay particles in the clay slurries that optionally passed the 100 mesh screen and/or were subjected to any optional centrifugalization step(s) is performed in a high speed fluid shear process (steps (i.3) and (ii.3)). Such further size reduction is preferably achieved by subjecting the clay slurries to high speed fluid shear as e. g. described in EP 0 220 346 A1.

The high speed fluid shear, to which the hormite and smectite clay slurries which pass the 100 mesh screen are subjected, is preferably effected by passing the pumpable slurries through a dispersion or colloid mill, which devices are often referred to in the art as "homogenizers". "Pumpability" can be ensured by further diluting the dispersions with an aqueous medium, preferably the aqueous medium as used in steps (i.1.) and (ii.1), and most preferably water. Dispersion and colloid mills are well-known in the art, and are succinctly discussed and characterized at pages 842 and 843 of "Chemical Engineers Handbook", edited by R. H. Perry and C. H. Chilton, 5th Edition, 1973, McGraw Hill Book Company (New York). As is pointed out in this standard reference work, this type of device constitutes a special class of mills normally employed for dispersion and colloidal operations. Such mills operate on a principle of high speed fluid shear. Preferred mills for use in the invention are characterized by including or defining a narrow gap across which a pressure differential is maintained and through which in accordance with the invention the pumpable slurries are passed.

Preferably, the high speed fluid shear required in steps (i.3) and (ii.3) is effected by passing the slurries at high velocities through a narrow gap, across which a high pressure differential is maintained. This type of action, e.g., can be effected in the well-known Manton-Gaulin mill, which device is sometimes referred to as the "Gaulin homogenizer" or "MG mill". In the basic operation of such device, a reciprocating, positive displacement piston-type pump is provided with a homogenizing valve assembly which is affixed to the pump discharge. The not yet completely homogenized slurry enters the valve area at high pressure and low velocity. As it passes through a narrow orifice at the valve, (which is a close-clearance area between the valve and valve seat), its velocity is increased to levels approaching sonic speed. This provides high shear forces for reduction, and in the said device, these forces are further implemented as this high velocity stream strikes an impact ring where its direction is changed. Of further interest in this connection, is U.S. Pat. No. 3,348,778, to M. I. Chin et al, which discloses the use of a Manton-Gaulin type arrangement for treating kaolin clays in order to improve the rheology of a clay-water system subsequently formed from same. For present purposes, the patent is of interest in disclosing certain useful arrangements for the said mill, and further details of the construction of same. The patent also discusses the gap provided in the mills of the type disclosed, and properly observes that such gap is only in the order of 25 μm to 125 μm, but under certain conditions may be as large as 2.5 mm.

In those instances where a gap arrangement, as in the Manton-Gaulin mill, is utilized, said pressure differential across the gap is preferably in the range of from 7,000 kPa to 56,000 kPa with 14,000 to 35,000 kPa being more typical. Depending upon the specifics of the equipment, pressures higher than 56,000 kPa can readily be used.

Said slurries will typically include more than 85 weight-% of water, more preferred more than 90 weight-% of water and even more preferred more than 92 weight-% of water such as 92 to 97 or 98 weight-% of water based on the total weight of the slurry. However, the solids content can vary, and be above the indicated level, if appropriate dispersing agents are present. However the use of dispersing agents is usually not preferred. The principal requirement is that the slurry is pumpable, so that it is capable of being subjected to the aforementioned high speed fluid shear. In addition to the passage through a narrow gap, as in the aforementioned type Manton-Gaulin mill, the high speed fluid shear can also be effected, pursuant to the invention, by use of dispersion and colloid mills based upon a stator and a closely spaced rotor, wherein a high speed rotation is maintained between the two said elements. The slurry in this instance is subjected to the high speed fluid shear by being passed through the gap between the stator and the rotor. The well-known Greer mill is one example of this type of construction, and may be utilized as one instrumentality in practice of the invention. In the said Greer mill a narrow gap is defined by a stationary stator and a rotor which rotates within the vertically surrounding stator. The slurry to be treated in accordance with the invention is passed through that gap under pressure.

Further instrumentalities useful in effecting high speed fluid shear are discussed in the aforementioned reference to Perry and Chilton.

Passage of the clay slurry through a narrow pressurized gap in accordance with steps (i.3) and (ii.3) of the invention yields results that differ fundamentally from what occurs where only conventional blades or disc-type mixers such as a Waring Blender or a Cowles dissolver are utilized. This can be appreciated by comparing the shearing mechanisms imposed upon a fluid in a Cowles high speed dissolver—as may be used in the dispersing steps (i.1) and (ii.1) of the process of the present invention—with those imposed by the Manton-Gaulin mill—as may be used in steps (i.3) and (ii.3) of the process according to the present invention.

In the Cowles high speed dissolver shear is imposed upon a fluid by smashing actions of the blades (mechanical energy) and by smearing arising from laminar flow. Of the two, the smearing mechanism is the more important, and the efficiency of dispersion is determined by the stirring design configuration (rounds per minute, blade size, container size and shape). Swirling, turbulent flow creates efficient mixing but most significantly, intermingled pockets remain undispersed. Conversely, the laminar flow pattern may fail to provide efficient mixing, but the drag of layers over each other tears any clumps of particles apart, and efficient dispersion is obtained. Additionally, the more viscous the fluid, the more effective is the tearing, and the efficiency of the Cowles dissolver increases with increasing viscosity.

In contrast, the Manton-Gaulin mill allows the product to enter an expansion valve at a very high pressure and low velocity. As the product enters the close clearance area between the valve and the valve seat there is a rapid increase in velocity to the order of 300 m/sec with a corresponding decrease in pressure arising from the Bernoulli effect. This allows the formation of bubbles which implode with extreme energy as the product velocity decreases upon leaving the valve seat area. This promotes the creation of shock waves which induce shearing by collision; this process is known as cavitation. In contrast to the behavior of the Cowles apparatus, the efficiency of the Manton-Gaulin mill decreases with increasing viscosity arising from rapid dissipation of shear waves.

It can be shown the shear stress in a typical Cowles dissolver is approximately 2013 dynes/cm$^2$. This assumes a fluid density of 1.0 g/cm$^3$ and a circular rim blade velocity of approximately 2000 cm/sec for a dissolver with a 4 inch (10.2 cm) blade.

Although the Manton-Gaulin mill does not employ laminar flow as a shearing mechanism, assuming a laminar model may give an upper bound to the shear rate and shear stresses encountered upon cavitation. Because of the extreme pressure shearing of the order of magnitude of laminar stress may be encountered.

Assuming this and a reasonable distance between the valve and valve seat (100 μm) a shear rate may be estimated from manufacturer specifications as about $2.9 \times 10^6$ sec$^{-1}$. The shear stress can then be shown to be $8.8 \times 10^7$ dynes cm$^{-1}$.

From the foregoing it may be concluded that at least the following differences exist between a Cowles dissolver and a Manton-Gaulin device:
1. The Manton-Gaulin mill operates on the principle of cavitation involving extremely high particle velocities and turbulent flow. The Cowles apparatus operates at low shear rates with efficient dispersion arising from laminar flow.
2. The efficiency of the Cowles disperser increases with increasing viscosity; that of the Gaulin apparatus decreases.
3. Clay particles in suspension experience much higher shear stresses and shear rates in the Gaulin apparatus, although these are not amenable to direct calculation.

The use of high speed fluid shear in the present invention is not only important in providing the benefits for the smectite (step ii.3) which are discussed in the foregoing patents; but moreover in the instances of the sepiolite and/or palygorskite (step i.3), such high speed fluid shearing acts to "debundle" the otherwise "bundled" type of structures which exist in the latter minerals. The hormite clay exist as needle-like structures, whereby the single needle form a needle felt. The term "debundling" in the present context means to individualize single needles from the needle felt.

In step iii. of the process according to the present invention the clay slurries as prepared in steps i. and ii. are combined. Before combining the slurries, their clay contents are determined by drying 10 g of each slurry at 130° C. for 90 min, followed by cooling to room temperature. The amounts of the slurries formed in steps i. and ii., which are to be combined in step iii., depend on the desired ratio of hormite clay and smectite clay in the resultant combined clay slurry (c). The minimum requirement is that the hormite clay content exceeds the smectite clay content in combined clay slurry (c).

Step iv. of the process according to the present invention, i. e. treating the combined clay slurry (c) with one or more quaternary alkyl-ammonium salts is preferably carried out at temperatures exceeding room temperature (i. e. 25° C.). A preferred temperature range is from 40° C. to the boiling temperature of the slurry at standard pressure, more preferred 40 to 80° C., even more preferred 50 to 70° C., as e. g. 60° C.

Preferably the one or more quaternary alkyl-ammonium salts are added to the combined clay slurry (c) under agitation of the combined clay slurry (c), as e. g. stirring of the slurry.

The amount of the one or more quaternary alkyl-ammonium salt(s) in relation to 100 g of clay in the combined clay slurry (c) typically ranges from 5 mmol to 80 mmol, preferably 20 to 65 mmol, and more preferred 30 to 55 mmol. Where the mixed mineral organoclay additive is intended to be used in high temperature applications a more preferred range is 5 to 50 mmol, and even more preferred 10 to 35 mmol of the quaternary alkyl-ammonium salt per 100 g of the clay mixture. For many other thixotropic applications a range of about 25 to 80 mmol, and preferably 35 to 65 mmol, of the quaternary alkyl-ammonium salt is used per 100 g of the clay mixture.

Preferably the thus produced quaternary alkyl-ammonium salt treated mineral clay mixture formed in step iv. is separated from the aqueous medium as described in step v. The separation can be achieved by all conventional means which are typically used to separate an insoluble material from the surrounding liquid phase, as e.g. filtration, centrifugation etc. Most preferred the quaternary alkyl-ammonium salt treated mineral clay mixture is filtered off, preferably supported by applying a vacuum. The resultant mixed mineral organoclay product is preferably dried, which is most preferably done at elevated temperature, as e. g. at a temperature in the range from 40 to 80° C., more preferred 50 to 70° C., as e. g. 60° C. Typical and acceptable residual amounts of moisture contained in resultant quaternary alkyl-ammonium salt treated mineral clay mixture are below 10 weight-%, preferably below 8 weight-%, even more preferred below 6 weight-% and most preferred below 4 weight-%, based on the total weight of the quaternary alkyl-ammonium salt treated mineral clay mixture and typically range from 1 or 2 weight-% to 6 weight-% based on the total weight of the quaternary alkyl-ammonium salt treated mineral clay mixture.

If desired, e. g. for better handling, the solid quaternary alkyl-ammonium salt treated mineral clay mixture particles may be reduced in size by grinding, milling or the like.

The second embodiment of the above general process of manufacturing the mixed mineral organoclay additive of the present invention differs from the first embodiment, in that steps (i.3) and (ii.3) are omitted and that step (iii.) is followed by subjecting the combined clay slurry (c) to high speed fluid shear before treating the combined clay slurry (c) with one or more quaternary alkyl-ammonium salts in step (iv.). The high speed fluid shear conditions are the same as described above.

All of the aforementioned process steps can be transferred into an industrial-scale production. Industrial-scale production requires the adaption of processing devices used. For example, for drying and milling purposes among others the following general methods are suitable to be used in an industrial scale production of the mixed mineral organoclay additive produced according to the process of the present invention: dry milling, flash drying, fluid bed drying, vacuum drying, jet mill drying, drum drying, and chamber drying. In some of the aforementioned drying processes an integrated milling step is included, e.g. spray drying. If as drying process is used, which does not have an integrated milling process, an additional milling step has to be performed, e.g. by using an air classifying mill. Drying temperatures can individually be adjusted to achieve the required water content. Filtration procedures are usually performed in filter presses. Manufacturing of the aqueous hormite clay slurry (a) and the aqueous smectite clay slurry (b) is preferably carried out at ambient temperature, whereas the treatment of the combined clay slurry (c) with one or more quaternary alkyl-ammonium salts is preferably carried out at temperatures exceeding ambient temperature. A preferred temperature range is from 40° C. to the boiling temperature of the slurry at standard pressure, more preferred 40 to 80° C., even more preferred 50 to 70° C., as e.g. 60° C.

The Mixed Mineral Organoclay Rheology Additives as Prepared According to the Process of the Present Invention While typical organoclays are made out of one kind of clay particles, e.g., bentonite or hectorite, the mixed mineral organoclay rheology additives according to the present invention are different. They are, by design, built out of several clay materials. They are built out of different clays with different-shaped particles. Different-shaped clays are usually mined and purified separately. At least at the step of rendering the surfaces hydrophobic they are packed together in one reaction vessel.

The unique shape of these mixed minerals contributes to their unique performance. Due to a mix of platelet-shaped, ribbon-shaped and/or pipe-shaped clays, the product particles cannot be stacked parallel and as dense as the uniformly platelet shaped conventional organoclays. The various particles are not as close to each other. Translated into application properties, this means that the particles in mixed mineral organoclay rheology additives can be separated from each other more easily than the particles in conventional organoclays. This gives quicker and easier dispersion, even easier than easy-dispersible conventional organoclays.

The microscopic structure can be seen in macro by exhibiting a lower bulk density compared to conventional organoclays. But compared to fumed silica, the density is still much higher. Even for mixed mineral organoclay rheology additives that give a similar performance to fumed silica, it is easier to handle them due to their higher density. Mixed mineral organoclay rheology additives are less dusting and need less space in bags and warehouses.

Beside the above mentioned exceptional properties of the "conventional" mixed mineral organoclay rheology additives, the mixed mineral organoclay rheology additives as produced by the process according to the present invention provide an even higher thickening effect and in particular a higher thixotroping effect compared to "conventional" ones. This is in particular true for the selection of the specific hormite clays used in the process of manufacture of the mixed mineral organoclay rheology additives. The herein used hormite clays are low in aluminum and iron content, expressed as $Al_2O_3$ and $Fe_2O_3$ contents, respectively, as will be described in more detail below.

Also an object of the present invention is the mixed mineral organoclay additive comprising or consisting of the quaternary alkyl-ammonium salt treated mineral clay mixture.

Hormite Clays as Used in the Process According to the Present Invention

Hormite clays belong to the group of phyllosilicates. The hormite clay or hormite clays to be used in the manufacture of the mixed mineral organoclay rheology additives of the present invention are sepiolites and/or palygorskites (also known as attapulgites).

Of the two mentioned hormite clays, sepiolite is preferred for use in the invention. Both sepiolite and palygorskite contain a continuous two-dimensional tetrahedral sheet of composition, but they differ from the other layer silicates in lacking continuous octahedral sheets. Further details of the structures of these minerals, including the structural distinctions between the two idealized structures of sepiolite and palygorskite, may be found in "Developments in Palygorskite-Sepiolite Research", Galan and Singer, Elsevier, 2011.

Both hormite clays have a very similar idealized structure. In nature sepiolites and palygorskites differ from idealized structures but can easily be characterized as such. According to recent literature there is no compositional gap between sepiolites and palygorsiktes, but on the contrary, a continuous series of minerals between the idealized structures exists (Galan and Singer, "Developments in Palygorskite-Sepiolite Research", Elsevier, 2011, pages 49-51, in particular FIG. 8 at page 51).

The sepiolites and palygorskites as employed herein are raw clay materials which may be mined at the same mining site or different mining sites around the world. Such material inevitably contains some impurities like quartz or dolomite. The terms "sepiolite" and "palygorskite" as used herein are to be understood to refer to raw materials preferably containing at least 90 wt.-%, more preferable at least 95 wt.-% and even more preferably at least 97 wt.-% and best at least 99 wt.-% of the respective hormite clay morphology in the raw material. In mineralogy powder X-ray diffraction patterns are a typical tool for detecting crystalline impurities in sepiolites and palygorskites by the presence of characteristic reflection of these impurities in powder X-ray diffraction patterns. So, impurities of quartz, cristobalite, calzite, dolomite etc. can be detected easily as they show characteristic reflection in powder X-ray diffraction patterns at different $2\theta$ values than sepiolites and palygorskite samples.

In the above mentioned scientific book of Galan and Singer it is described that natural sepiolites and palygorskites always contain varying amounts of aluminum and iron in their structures. In particular aluminum and iron can replace magnesium and/or silicon in the respective idealized structures of sepiolites and palygorskites. The content of those metals is usually expressed in mineralogy in the form of their oxides, i.e. as aluminum oxide $Al_2O_3$ and iron oxide $Fe_2O_3$, respectively. The aluminum oxide content of sepiolites can be as high as approximately 8.9% by weight and for palygorskite even higher $Al_2O_3$ contents were observed ranging up to 24.4% by weight, as referenced in Galan and Singer, "Developments in Palygorskite-Sepiolite Research", Elsevier, 2011.

The $Fe_2O_3$ content can be as high as 20% by weight in sepiolites from Middle Atlas of Morocco and from Tyrol and for palygorskite of up to 14.8% by weight, as referenced in Galan and Singer, "Developments in Palygorskite-Sepiolite Research", Elsevier, 2011.

It was first found by the present inventors that the content of $Al_2O_3$ and/or $Fe_2O_3$ in such sepiolites and palygorskites as mined strongly affects the rheological behavior of the mixed mineral organoclay manufactured according to the present invention. The impact of such selection of starting materials to be used in the process of the present invention is not suggested anywhere in the art.

The content of $Al_2O_3$ and $Fe_2O_3$ is determined by inductively coupled plasma optical emission spectrometry (ICP-OES) as explained in detail in the experimental section of the present invention.

As a matter of principle the content of $Al_2O_3$ and $Fe_2O_3$ in the hormite clays should be as low as possible, ideally 0 wt.-%, based on the total weight of the hormite clay fraction. However in the natural raw clays a value of 0 wt.-% or 0.1 wt.-%, based on the total weight of the hormite clay fraction will hardly be found. Therefore a most preferred and more common lower value might e.g. be 0.15 wt.-% or 0.2 wt.-% for $Fe_2O_3$, based on the total weight of the hormite clay fraction, and 0.2 wt.-% or 0.5 wt.-% for $Al_2O_3$, based on the total weight of the hormite clay fraction; and 0.35 wt.-% or 0.5 wt.-% for the combined amount of $Al_2O_3$ and $Fe_2O_3$, based on the total weight of the hormite clay fraction. As upper limits less than 3 wt.-% for $Al_2O_3$, less than 1 wt.-% for $Fe_2O_3$ and less than 3.5 wt.-% for the combined amount of $Al_2O_3$ and $Fe_2O_3$, based on the total weight of the fraction of one or more hormite clays (i) should be observed.

Particularly preferred amounts of $Al_2O_3$ are 2.6 wt.-% and less or even more preferred 2.0 wt.-% and less, based on the total weight of the fraction of one or more hormite clays (i).

Particularly preferred amounts of $Fe_2O_3$ are 0.7 wt.-% and less or even more preferred 0.6 wt.-% and less, based on the total weight of the fraction of one or more hormite clays (i).

Particularly preferred amounts of the combined amount of $Al_2O_3$ and $Fe_2O_3$ are 3.3 wt.-% and less and even more preferred 2.6 wt.-% and less, based on the total weight of the fraction of one or more hormite clays (i).

As used herein, the term "fraction of one or more hormite clays" is equivalent to the term "hormite clay fraction containing or consisting of one or more hormite clays". This fraction of one or more hormite clays is therefore distinct from a "fraction of one or more smectite clays" i. e. a "smectite clay fraction containing or consisting of one or more smectite clays".

The term "one or more hormite clays" is to be understood in a broad sense and includes the possible presence of different types of hormite clay, i. e. the presence of sepiolite and palygorskite, but it also includes the possible presence of different batches of one type of clay, e.g. different sepiolite clay batches or different palygorskite clay batches or mixtures thereof. The same applies to the term "one or more smectite clays".

The term "different batches" as used herein encompasses the possibility that those batches are from different mining sites or from different mine work places within one mining site.

If different batches of hormite clay are contained in the hormite clay fraction, it is most preferred that each batch of hormite clay contained in the hormite clay fraction fulfills the requirement to contain less than 3.0% by weight of $Al_2O_3$, less than 1.0% by weight of $Fe_2O_3$, and less than 3.5% by weight of the combination of $Al_2O_3$ and $Fe_2O_3$. However, it is also possible that one or more batches of hormite clay contained in the hormite clay fraction lie outside this requirement, i.e. contain more than or equal to 3.0% by weight of $Al_2O_3$ and/or more than or equal to 1.0% by weight of $Fe_2O_3$ and/or more than or equal to 3.5% by weight of the combination of $Al_2O_3$ and $Fe_2O_3$, provided that the hormite clay fraction as a whole fulfills the requirement to contain less than 3.0% by weight of $Al_2O_3$, less than 1.0% by weight of $Fe_2O_3$, and less than 3.5% by weight of the combination of $Al_2O_3$ and $Fe_2O_3$.

In case different hormite clay batches are contained in the fraction of one or more hormite clays and one or more of those batches contains more than or equal to 3.0% by weight of $Al_2O_3$ and/or more than or equal to 1.0% by weight of $Fe_2O_3$ and/or more than or equal to 3.5% by weight of the combination of $Al_2O_3$ and $Fe_2O_3$, such batches should preferably contain less than 5.0% by weight of $Al_2O_3$, less than 2.0% by weight of $Fe_2O_3$, and less than 6.5% by weight of the combination of $Al_2O_3$ and $Fe_2O_3$, even more preferred such batches should contain less than 4.0% by weight of $Al_2O_3$, less than 1.5% by weight of $Fe_2O_3$, and less than 5.0% by weight of the combination of $Al_2O_3$ and $Fe_2O_3$, and most preferred such batches should contain less than 3.5% by weight of $Al_2O_3$, less than 1.2% by weight of $Fe_2O_3$, and less than 4.0% by weight of the combination of $Al_2O_3$ and $Fe_2O_3$.

In case different hormite clay batches are contained in the fraction of one or more hormite clays and one or more of those batches lie outside the requirement for the hormite clay fraction to contain less than 3.0% by weight of $Al_2O_3$, less than 1.0% by weight of $Fe_2O_3$, and less than 3.5% by weight of the combination of $Al_2O_3$ and $Fe_2O_3$, as lined out in the previous paragraph, it is preferred that the one or more hormite clay batches which fulfill the requirement to contain less than 3.0% by weight of $Al_2O_3$, less than 1.0% by weight of $Fe_2O_3$, and less than 3.5% by weight of the combination of $Al_2O_3$ and $Fe_2O_3$ are contained in the hormite clay fraction with a minimum content of at least 25% by weight, more preferably at least 30 by weight, even more preferred at least 35% by weight, even more preferred at least 40% by weight, even more preferred at least 50% by weight, even more preferred at least 60% by weight, even more preferred at least 75% by weight and most preferred at least 80% by weight, based on the total weight of the hormite clay fraction.

If there is for example a need for an exceptionally good thickening effect in a specific application, it might however become necessary to only use hormite clay batches inside the required range for the hormite clay fraction to contain less than 3.0% by weight of $Al_2O_3$, less than 1.0% by weight of $Fe_2O_3$, and less than 3.5% by weight of the combination of $Al_2O_3$ and $Fe_2O_3$ or at least to use a high amount of such batches, based on the total weight of the hormite clay fraction. In case, that not all hormite clay batches fulfill the requirement set for the complete hormite clay fraction, it should, in order to further improve the thickening quality of the additive, taken into consideration to use only such batches outside the requirement set for the complete hormite clay fraction, which are close to the requirement for the complete hormite clay fraction, i.e. those which are only slightly outside this requirement.

Typically, a sample of the hormite clay fraction(s) to be used in i. forming an aqueous hormite clay slurry (a), is tested as described within the present invention. On the basis of the result of the testing the hormite clay materials which meet the above requirements are used in the manufacturing process according to the invention.

Determination of the $Al_2O_3$ and $Fe_2O_3$ Contents of the Hormite Clay Fraction For the purpose of determining the $Al_2O_3$ and $Fe_2O_3$ contents of the hormite clay fraction, in the context of the present invention, the raw hormite clay fraction as mined is preferably grained, most preferably to clay particles having particles sizes of about 2 to 3 mm. This can be accomplished by crushing, pulverizing or grinding the raw clay as mined. Those particles are dried for approximately 2-3 hours at 105° C. to constant weight before being subjected to chemical extraction by means of hydrofluoric acid and hydrochloric acid as explained in detail in the example section of the present invention. The extraction is followed by coupled plasma optical emission spectrometry (ICP-OES) against element standards of aluminum and iron. The aluminum and iron content is expressed in form of the respective oxides $Al_2O_3$ and $Fe_2O_3$, and based on the hormite clay fraction comprising the one or more hormite clays as mined, preferably grained and dried as defined in this procedure.

Smectite Clays as Used in the Process According to the Present Invention

As utilized in the present specification, the term "smectite clays" refers to the general class of clay minerals with expanding crystal lattices, with the exception of vermiculite. This includes the dioctahedral smectites which consist of montmorillonite, beidellite, and nontronite, and to the trioctahedral smectites, which includes saponite, hectorite, and sauconite. Also encompassed are smectite-clays prepared synthetically, e.g. by hydrothermal processes as disclosed in U.S. Pat. No. 3,252,757; U.S. Pat. No. 3,586,468; U.S. Pat. No. 3,666,407; U.S. Pat. No. 3,671,190; U.S. Pat. No. 3,844,978; U.S. Pat. No. 3,844,979; U.S. Pat. No. 3,852,405; and U.S. Pat. No. 3,855,147.

Preferably, the smectite is a natural or synthetic clay mineral selected from the group consisting of hectorite, montmorillonite, bentonite, beidelite, saponite, stevensite and mixtures thereof. Particularly preferred smectites are saponite and hectorite.

Mixture of Hormite Clay(s) and Smectite Clay(s) in Form of their Aqueous Slurries Before being treated with quaternary alkyl-ammonium salts the one or more hormite clay and the one or more smectite clay are mixed in form of aqueous slurries in such ratio, that the weight of the one or more hormite clay(s) exceeds the weight of the one or more smectite clay(s), based on the total weight of clay. The weight of the clay contained in each slurry can be determined by drying a part of the respective slurry (e. g. 10 ml) at 130° C. for 90 min. The dry residue is the amount of clay contained in relation to the weight of the slurry (e. g. 10 ml) before drying.

Most preferably no other clays but the hormite and smectite clays are contained in the combined clay slurry, despite of impurities that might be contained. If impurities are contained the amount thereof should preferably not exceed 10 wt.-%, even more preferred 5 wt.-%, even better 3 wt.-% and most preferred the amount should not exceed 1 wt.-% based on the total weight of clays in the combined clay slurry.

Preferably the amount of the one or more hormite clays in the combined clay slurry is from more than 50 to 95 wt.-%, even more preferred from 60 to 90 wt.-% and most preferred from 75 to 85 wt.-% based on the total weight of clays in combined clay slurry.

Preferably the amount of the one or more smectite clays in the combined clay slurry is from 5 to 50 wt.-%, even more preferred 10 to 30 wt.-% and most preferred 15 to 25 wt.-% based on the total weight of the clays in the combined clay slurry.

Most preferred the amount of the one or more hormite clays in the combined clay slurry is from 75 to 85 wt.-%, while the amount of the one or more smectite clays is from 15 to 25 wt.-%, both based on the total weight of the clays in the combined clay slurry.

The above weight-% ranges apply irrespective of whether the hormite clay fraction contains only 1 type of hormite clay, as e. g. sepiolite, or more than one type of hormite clay. Preferably the hormite clay fraction contains only sepiolite clay.

The above weight-% ranges apply irrespective of whether the smectite clay fraction contains only 1 type of smectite clay, as e. g. saponite or hectorite, or more than one type of smectite clay, like a mixture of saponite and hectorite. Preferably the smectite clay fraction contains only saponite or hectorite clay.

The above amounts are to be understood before being treated with the quaternary alkyl-ammonium salts.

Quaternary Alkyl-Ammonium Salts as Used in the Process According to the Present Invention The quaternary alkyl-ammonium salts employed for treating the clays in the combined clay slurries preferably comprise quaternary alkyl-ammonium salts containing the same or different, straight-chain and/or branched, saturated and/or unsaturated alkyl groups with 1 to 22 carbon atoms and/or aromatic groups with 6 to 14, preferably 6 to 10 carbon atoms, preferably benzyl groups, whereby the counter-ion moiety is preferably selected from the group consisting of halogenide, such as chloride and bromide, methylsulfate, sulfate, nitrate, hydroxide, acetate, phosphate and mixtures thereof, most preferably chloride, bromide and methylsulfate. "Treating" the clay mixture with one or more quaternary ammonium salts encompasses chemically reacting as well as physical and/or chemical adsorption.

Particularly preferred quaternary alkyl-ammonium salts can be described by the general formula $(C_{1-10}$-alkyl$)_n$ $(C_{12-22}$-alkyl$)_m$(benzyl$)_p$ $N^+X^-$, wherein n+m+p=4 and n=1, 2 or 3, m=1 or 2, p=0 or 1 and $X^-$=halogenide, sulfate, nitrate, hydroxide, acetate or phosphate, preferably chloride, bromide or methylsulfate. Especially preferred quaternary alkyl-ammonium salts are dimethyl di($C_{14-18}$-alkyl) ammonium chloride, methyl benzyl di($C_{14-18}$-alkyl) ammonium chloride, dimethyl benzyl ($C_{14-18}$-alkyl)ammonium chloride, and dimethyl (2-ethylhexyl) ($C_{14-18}$-alkyl)ammonium sulfate, trimethyl ($C_{14-18}$-alkyl)ammonium chloride and mixtures of two or more of the preferred choices. The above $C_{14-18}$ alkyl group is preferably a hydrogenated tallow-alkyl group.

Most preferred are benzyl-dihydrogenated tallow-methyl ammonium chloride and dimethyl-dihydrogenated tallow ammonium chloride and mixtures thereof. If a mixture of both is employed it is even more preferred to use the benzyl-dihydrogenated tallow-methyl ammonium chloride in an amount of more than 50 weight-% like 60, 70, 75 or 80 weight-%, based on the total amount of benzyl-dihydrogenated tallow-methyl ammonium chloride and dimethyl-dihydrogenated tallow ammonium chloride. The clays in the combined clay slurry are typically treated with 5 to 80 mmol of the quaternary alkyl-ammonium salt per 100 g of clay. Where the organoclay is used in high temperature applications, like in drilling fluids, but not limited to those, a more preferred range is 5 to 50 mmol, and even more optimal, 10 to 35 mmol of the quaternary alkyl-ammonium salt per 100 g of the clay mixture. For many other thixotropic applications a range of about 25 to 80 mmol, and preferably 35 to 65 mmol, of the quaternary alkyl-ammonium salt is used per 100 g of the clay in the slurry.

The used amount can be adjusted to the cation exchange capacity of the combined clay slurry, i. e. the slurry containing the hormite and smectite clay fractions, and should preferably be at least 75% of the cation exchange capacity of said clay slurry.

USES ACCORDING TO THE PRESENT INVENTION

Yet another primary object of the present invention is the use of at least one of the mixed mineral organoclay additives obtained by the process according to the present invention as thickener in liquid compositions, preferably in non-aqueous liquid compositions which even more preferably comprise at least one epoxy resin.
Epoxy Resins for Use in the Present Invention Epoxy resins according to this invention contain in average more than one oxirane ring per molecule. They can be cured with so-called hardeners (also called "curing agents") by reaction of the oxirane ring with a functional group of the hardener which is reactive towards the oxirane ring. Commonly used epoxy resins are formed by reacting reactive phenols, alcohols, acids and/or amines with epichlorohydrin. Most commonly the oxirane ring is present in the epoxy resins in form of a glycidyl group. The number of reactive base entities, which form epoxy resins by reaction of epichlorohydrin is almost unlimited, resulting in a large number of technically important resins. Moreover unsaturated aliphatic and cycloaliphatic compounds may be epoxidized with e. g. peracetic acid.

In principle all of the epoxy resins obtained in the before mentioned processes can be used in the present invention.

Preferably the epoxy resins used in the present invention are selected from the group consisting of glycidyl ethers, like bisphenol A diglycidyl ether, bisphenol F diglycidyl ether, epoxide novolak, epoxide o-cresol novolak, 1,3-propane-, 1,4-butane- or 1,6-hexane-diglycidyl ether and polyalkylenoxide glycidyl ether; glycidyl esters, like hexahydrophthalic acid diglycidyl ester; glycidyl amines, like diglycidyl anilin or tetraglycidylmethylene dianiline; cycloaliphatic epoxides, like 3,4-epoxycyclohexyl-epoxyethane or 3,4-epoxycyclohexylmethyl-3,4-epoxy-cyclohexane carboxylate; and glycidyl isocyanurates, like trisglycidyl isocyanurate.

The epoxy resins used in the present invention preferably posses an epoxide equivalent weight of 100 to 300 g, particularly preferred of 130 to 220 g. For example bisphenol-A-diglycidylether posses an epoxide equivalent weight of approximately 170.2 g (molecular weight: 340.4 g/mol; two oxirane groups; 340.4 g/2=170.2 g).

Further epoxy resins which may be used in the liquid compositions of the present invention are for example described in EP 0 835 910 A1, EP 2 085 426 A1 or EP 1141071 A1.
Hardeners for Use with the Epoxy Resins While the typical storage form of the epoxy resin containing liquid composition of the present invention does usually not contain a hardener, as explained above, a hardener will be mixed with or into such liquid composition of the invention shortly before use to start a curing reaction. Such formulations containing a hardener are called "ready to use" formulations.

In the relevant technical literature hardeners for epoxy resins are well-known and are often called "epoxide hardeners" in accordance with their function (see, e. g.: Kittel, "Lehrbuch der Lacke and Beschichtungen", Vol. 2, $2^{nd}$ Ed., 1998, pp. 267 to 318). Epoxide hardeners are typically di- or polyfunctional compounds or polymers, the functional groups of which are apt to react with oxirane groups.

Usually hardeners functional epoxide-reactive groups are used in a stoichiometric amount in relation to the epoxide resins oxirane groups. The concentration of oxirane rings in the epoxide resin can be determined by titration. The amount of hardener can easily be determined from the equivalent weight of active hydrogen in the hardener. Preferably the epoxide hardeners which are suitable in the present invention are selected from the group consisting of diamines, polyamines, polyamides and cyclic carboxylic acid anhydrides. Particularly preferred are diamines, polyamines and polyamides. Even more preferred as epoxide hardeners are diamines and polyamines.

Particularly preferred diamines and polyamines can be selected from the group of aliphatic diamines and aliphatic polyamines, like diethylene triamine, triethylene tetramine or 3,3',5-trimethylhexamethylene diamine; cycloaliphatic amines, like 1,2-cyclohexyl diamine, isophorone diamine and its mixture of isomers or m-xylylen diamine; aromatic amines, like methylene dianiline or 4,4-diamino diphenyl sulfone; modified amines, like Mannich bases (e. g. diethylene triamine-phenol-Mannich base) or amine adducts from 3,3',5-trimethylhexamethylenediamine and bisphenol A diglycidyl ether.

Particularly preferred hardeners of the polyamide type are polyaminoamides and dicyan diamide.

Typical representatives of cyclic carboxylic acid anhydride type hardeners being used in thermoset resin systems are e. g. phthalic anhydride or hexahydrophthalic anhydride.

Preferred active hydrogen equivalent weights in the hardener are from 15 to 70 g, even more preferred 20 to 60 g, e. g. for isophorone diamine the active hydrogen equivalent weight is 42.57 g (molecular weight: 170.3 g/mol; 2 $NH_2$ groups with two active hydrogens each=4 active hydrogens; 170.3 g divided by 4=42.57 g).

A non-limiting listing of suitable hardeners can e. g. be found in EP 0835 910 A1.

The mixed mineral organoclay rheology additives produced according to the process of the present invention can also be used in the hardener composition.
Further Fields of Application of the Mixed Mineral Organoclay Rheology Additives as Produced According to the Present Invention The mixed mineral organoclay additives as produced according to the process of the present invention can be used as thickening agent, more particularly as thixotroping agent.

The mixed mineral organoclay additives as produced according to the process of the present invention are typically used in a wide variety of liquid organic compositions. "A composition" in the present context is a formulation containing the additive of the present invention and at least one further chemical entity. "A liquid composition" in the present context is a composition which is in a liquid state at the temperature at which it is used and supplemented with the additive as produced according to the process of the present invention. Preferably the liquid organic compositions are liquid at temperatures below 40° C., more preferably they are liquid at 25° C. (i. e. room temperature). A "liquid organic composition" is a liquid composition containing the additive as produced according to the process of the present invention and at least one further chemical entity belonging to organic entities. Such organic entities can e. g. be compounds or polymers, or mixtures thereof and with each other. Beside non-soluble ingredients, as e.g. fillers and pigments which may also be contained in the liquid organic compositions, the organic entities which differ from the additive of the present invention are preferably contained in an amount of at least 50 wt.-% more preferably in an amount of 60 wt.-% and most preferably in an amount of 70 wt.-% or more.

Examples of liquid organic compositions are such as coating materials, sealants, adhesives, oil drilling fluids, gas drilling fluids, composite materials like nanocomposites, and moulding compounds or simply a liquid organic composition which contains besides the rheology additive only one or more organic solvents. Such liquid organic compositions contain the mixed mineral organoclay rheology additive as produced according to the process of the present invention typically in an additive amount from 0.1 to 10 wt.-%, more preferably 0.1 to 8 wt.-% and even more preferred 0.5 to 5 wt.-%, based on the total weight of the liquid organic composition.

A big challenge for conventional organoclays are epoxy resin containing compositions such as e. g. coatings, adhesives and sealants. Particularly low-solvent or even solvent-free epoxy coating compositions give few possibilities to optimize the dispersibility of conventional organoclays by low concentrated pregels.

Hence, typical systems where conventional organoclays fail are high-solid systems, and in particular solvent-free systems.

While the effects of the mixed mineral organoclay rheology additives as produced according to the process of the present invention are most pronounced in problematic systems like the epoxy resin containing composition, their thickening and thixotroping effect is of course not limited to this specific system. To the contrary, the thickening and more particularly thixotroping effects achieved with the use of the mixed mineral organoclay rheology additives as produced according to the process of the present invention are of course also developed in other liquid organic systems or simply in organic solvents.

Therefore the organoclay products as produced according to the process of the present invention are found to display unexpected and highly desirable properties when used as a thixotrope in various organic based systems besides the epoxy resin containing compositions.

For example, when used in gelling of unsaturated polyester resins, it was found that the additives as produced according to the invention can be stirred and dispersed directly in an unsaturated polyester resin/monomer solution, and will provide highly satisfactory gelling properties. Such unsaturated polyester resin compositions comprise a solution of an unsaturated polyester resin in a monomer which is capable of undergoing a crosslinking reaction with the resin. Suitable monomers for unsaturated polyester resin compositions are unsaturated aromatic compounds which comprise one or more ethylenically unsaturated radicals, such as a vinyl radical, substituted vinyl radical or an allylic radical, e.g. styrene (which is preferred), alpha-methylstyrene, divinyl benzene, allyl benzene and methyl methacrylate.

Such unsaturated polyester resins may be any of those known in the prior art. Suitable examples are polyesters of dienes such as dicyclopentadiene as well as polyesters of dicarboxylic acids and diols having a major amount of olefinic unsaturation, preferably 10 to 75 olefinic groups per 100 ester groups. The olefinic unsaturation is preferably derived from the carboxylic acid although the diol may also be unsaturated. Typical diols are ethylene glycol and propylene glycol. Typical unsaturated acids include maleic acid, fumaric acid and phthalic acid or anhydrides of these acids. Such polyester resins are made by conventional techniques of esterification. Preferably, unsaturated polyester resins, useful for preparing the polyester compositions, have weight average molecular weights of about 400 to 10,000 (determined by gel permeation chromatography) and preferably acid numbers in the range of from 30 to 45 mg KOH per gram of resin.

The additive as produced according to the process of the present invention is generally used in coating, adhesive or sealant compositions in an amount such that the final composition will have a flow curve which allows application but prevents drainage from or sag of the material from the surface to which the ready to use formulations are applied. In general, coating compositions will contain an amount of 0.1 to 10 wt. %, preferably 0.1 to 8 wt.-% and even more preferred 0.5 to 5 wt.-%, based on the total weight of the ready to use coating composition.

Furthermore the rheology additives as produced according to the process of the present invention yield surprising results when utilized in high temperature drilling fluids. By use of such additives as produced according to the process of the present invention an oil base environmentally benign drilling fluid composition can be provided which has a stable high viscosity and high gel strength at use temperatures up to at least 230° C. Such drilling fluid comprises a low toxicity biodegradable oil vehicle, and as a viscosifying agent, an additive as produced according to the process of the present invention.

The additives as produced according to the process of the present invention can also be used in preparing nanocomposites by any of the methods which are set forth in the prior referenced patents, and with a large variety of polymerizable resins such as polyamides, epoxy resins, polyvinyl resins, polyacrylamides, etc. When used in composites such as nanocomposites, the additives of the present invention yield unexpected improvements in the mechanical and other properties of the composite, including with respect to tensile strength, tensile modulus and flex modulus, all of which are highly significant attributes for the plastics and similar formulators.

The invention will now be illustrated by examples, which are to be regarded as illustrative and not delimitative of the invention. Unless otherwise indicated to the contrary, all parts and percentages are by weight.

Preparation Examples

The following 10 hormite clay samples are sepiolite samples obtained from one mining site in Spain. The samples were controlled by X-ray diffraction for mineral impurities in house. The existence of sepiolite, palygorskite is shown by a main peak (110) around 12.1 Angström and some smaller relating ones. The amount of crystalline impurities was detected by their material specific peaks in X-ray diffraction (XRD). The amount of crystalline quartz or dolomite impurities in all samples is lower than the detection limit of 0.2 wt.-%.

Determination of $Al_2O_3$ Content and $Fe_2O_3$ Content 10 g of the raw clay sample (as mined from the mining site) was finely grained and dried for 2-3 hours at 105° C. to constant weight. Approximately 500 mg of the dried sample was weight into a platinum crucible and humidified with 1 to 2 ml of dist. water. Carefully approximately 10 ml HF (40%) were added and vaporized on the laboratory sand bath until dryness. After that, 10 ml of concentrated HF were added again and vaporized to dryness again. This procedure was repeated one more time. Then 20 ml of concentrated HCl were added and vaporized again. Concentrated HCl was added up to the extent necessary to get a clear solution. The clear solution was rinsed into a 100 ml volumetric flask with distilled water and filled up to the mark. The metals were determined from this solution by means of inductively coupled plasma optical emission spectrometry (ICP-OES) against an element standard. The wavelengths used for Al were 308.215 nm, 396.152 nm, 394.401 nm. The wavelengths used for Fe were 238.204 nm, 259.939 nm, 234.349 nm. The aluminum content found was converted to $Al_2O_3$ content by multiplying with 1.889 (i.e. (molecular weight of $Al_2O_3$)/(molecular weight of Al)). The iron content was converted to the $Fe_2O_3$ content in the same way, but by multiplying with 1.430.

Preparation of Thickeners:

Preparation 1:

The sepiolite raw clay is milled to coarse grind of approximately 2-3 mm (⅛" mesh) (mill: Brown Direct Driven Pulverizer UD32, Spatula thickness 0.05 inches (1.27 mm), Bico Brown International). 850 g of the milled clay are added to 7930 g of hot water (135° F., i.e. 57° C.) in a 5 gallon (18.93 liter) straight sided plastic pail (top: 11.9 inches (30.2 cm); bottom: 10.92 inches (27.7 cm); overall height: 13.31 inches (33.8 cm)) under agitation strong enough to yield a vortex. The suspension is stirred at highest possible speed (4100 rpm) to not lose suspension over the pail walls with a Cowles blade on a dissolver for 1 hour (Cowles Dissolver Model 1-VJ; 4 inch (10.2 cm) Cowles Hi Shear Impeller BO 4 AOB from Morehouse Cowles), whereby in the first 5 min of this 1 hour a 15 inch (38.1 cm) spatula is held into the side of the pail to act as a baffle, which helps the slurry to thicken faster. Then, after the 1 hour step, another 8120 g of hot water are mixed in. This suspension is screened on a 100 mesh sieve to remove coarse particles. The suspension is subjected two times to a pass through a Manton-Gaulin homogenizer mill at 4500 psi (approximately 310 bar).

A saponite raw clay slurry is prepared in the same way. The amount of water is adjusted to yield an optimum processable viscosity. Additionally, after screening it is passed over a centrifuge for additional removing of coarse particles. It is passed through a Manton-Gaulin mill one time.

A mixed slurry is prepared containing a ratio of 80% sepiolite and 20% saponite on a dry base, meaning on the base of dried sepiolite and dried saponite, respectively. The general drying conditions for 10 g samples of any clay slurries are: 130° C. for 90 minutes, followed by cooling to room temperature in an exsiccator. The mix is heated to 60° C. and stirred to yield a vortex. 45 mmol/100 g clay of a mix of 75 wt.-% benzyl-dihydrogenated tallow-methyl ammonium chloride and 25 wt.-% dimethyl-dihydrogenated tallow ammonium chloride are added to the mix and are treated for 30 minutes. The resulting material is filtered on a vacuum funnel. The filter cake is dried in a blower oven at 60° C. to reach a residual of moisture of approximately 2-6%. Then it is milled on a pulverisette mill with a 0.2 mm sieve.

Preparation 2:

This is done as shown in preparation 1. Instead of saponite clay a hectorite clay is used. The amount of quaternary ammonium is increased to 49 mmol/100 g clay.

Application Examples

Liquid Composition for Use in the Present Invention:

The thickeners of preparations 1 and 2, respectively, were mixed into an epoxy resin in a Dispermat at 6000 rpm for 5 minutes.

| Epon 828* | 150 g |
|---|---|
| Preparation 1 or 2 | 3.75 g |

*fluid epoxy resin (bisphenol A diglycidyl ether-tpye) with epoxy equivalent weight of 185-192

Viscosity Measurements

The viscosities were measured in a Brookfield rheometer, spindle no. 3 at 1 rpm. As the viscosities of the resins differ all values were normalized to make them easier comparable, e.g. for preparation 1 in the Epon 828 epoxy resin the acceptable target viscosity is 113,400 mPas and was set as 1 (normalized viscosity). For preparation 2 in the Epon 828 epoxy resin the acceptable target viscosity is 189,000 mPas and was set as 1 (normalized viscosity). All viscosities shown in the following Tables 1 and 2, respectively, are ratios towards this setting and are easier intercomparable at one glance.

Normalized viscosities below 1 are not considered to be acceptable in this comparison, while normalized viscosities of 1 and above are acceptable.

TABLE 1

| Preparation 1 Series | Normalized Viscosity | "Chemical Composition" | |
|---|---|---|---|
| Made from sample no. | Epoxy Composition | $Al_2O_3$ | $Al_2O_3$ + $Fe_2O_3$ |
| 1* | 0.62 | 3.00 | 3.50 |
| 2 | 1.34 | 2.10 | 2.54 |
| 3 | 1.13 | 2.20 | 2.67 |
| 4 | 1.59 | 2.60 | 3.10 |
| 5* | 0.66 | 3.80 | 4.60 |
| 6* | 0.59 | 3.70 | 4.66 |
| 7 | 1.48 | 2.00 | 2.42 |
| 8 | 1.10 | 1.30 | 1.56 |
| 9* | 0.29 | 5.00 | 6.30 |
| 10 | 1.19 | 1.30 | 1.57 |

*Comparative Examples

TABLE 2

| Preparation 2 Series | Normalized Viscosity | "Chemical Composition" | |
|---|---|---|---|
| Made from sample no. | Epoxy Composition | $Al_2O_3$ | $Al_2O_3$ + $Fe_2O_3$ |
| 1* | 0.34 | 3.00 | 3.50 |
| 2 | 1.14 | 2.10 | 2.54 |
| 5* | 0.33 | 3.80 | 4.60 |
| 6* | 0.48 | 3.70 | 4.66 |
| 7 | 1.11 | 2.00 | 2.42 |
| 8 | 1.19 | 1.30 | 1.56 |
| 9* | 0.28 | 5.00 | 6.30 |
| 10 | 1.86 | 1.30 | 1.57 |

*Comparative Examples

Figure 1:
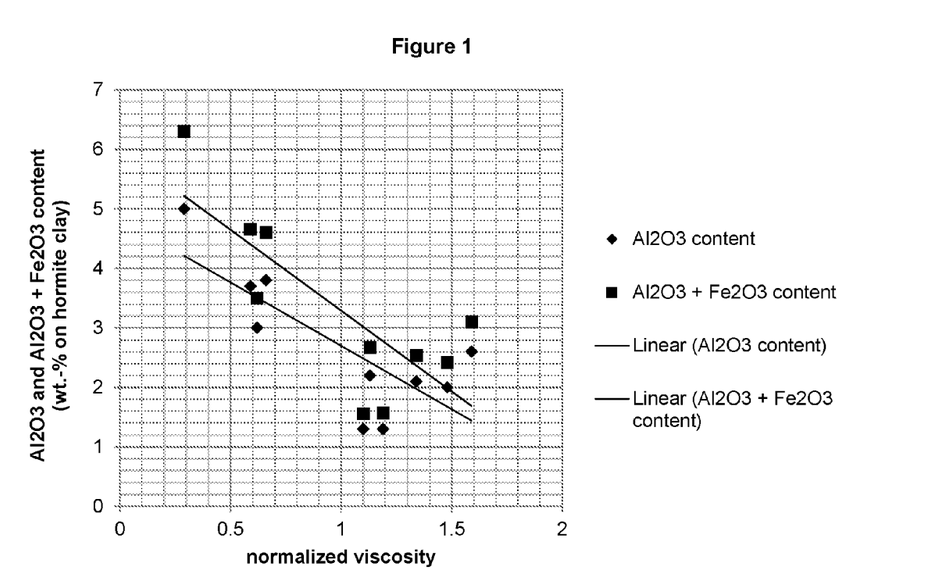
FIGS. 1 and 2, respectively, show the results from Tables 1 and 2 as xy-diagrams with the normalized viscosities as x-axis and $Al_2O_3$ content and the combined $Al_2O_3$+$Fe_2O_3$ content of the hormite fraction (i) as y-axis.
Figure 2:
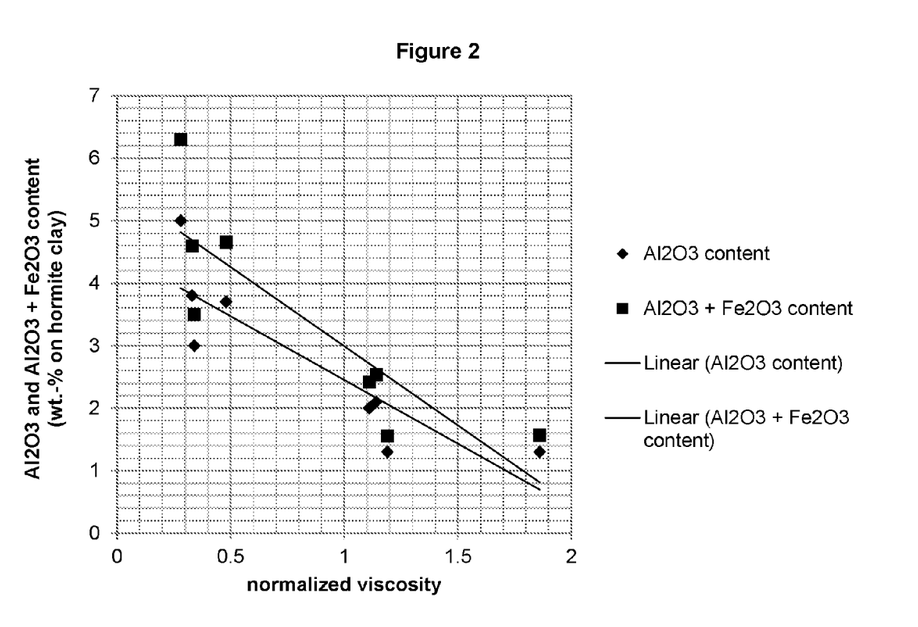

As can be learnt from FIGS. 1 and 2, there is a strong correlation of the effectiveness of the mineral organoclay rheology additives of the present invention in providing a thickening effect in the epoxy resin containing composition, dependent on the $Al_2O_3$ and $Fe_2O_3$ amount in the hormite clay fraction being used to produce the additives of the present invention.

The invention claimed is:

1. A process comprising mixing
at least one mixed mineral organoclay rheology additive, which comprises a quaternary alkyl-ammonium salt treated mineral clay mixture prepared by
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts
   v. separating the thus produced quaternary alkyl-ammonium salt treated mineral clay mixture from the aqueous medium,
in which
the aqueous hormite clay slurry (a) being formed by
   (i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$,
and
the aqueous smectite clay slurry (b) being formed by
   (ii.1) dispersing a fraction of one or more smectite clays in an aqueous medium to form a dispersion,
and
in that the weight of the hormite clay content exceeds the weight of the smectite clay content in the combined clay slurry (c); and
subjecting the dispersions formed in (i.1) and (ii.1) to high speed fluid shear before carrying out step iii. and/or after having carried out step iii,
in a liquid composition comprising at least one epoxy resin.

2. The process according to claim 1, the liquid composition further comprising a hardener comprising groups which react with epoxy groups.

3. The process according to claim 2, the hardener being selected from the group consisting of diamines, polyamines, polyamides and cyclic carboxylic acid anhydrides and mixtures thereof.

4. A process for producing a mixed mineral organoclay rheology additive, which comprises a quaternary alkyl-ammonium salt treated mineral clay mixture, the process being characterized by:
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts, and
   v. optionally separating the thus produced quaternary alkyl-ammonium salt treated mineral clay mixture from the aqueous medium,
in which
the aqueous hormite clay slurry (a) being formed by
   (i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$,
and
the aqueous smectite clay slurry (b) being formed by
   (ii.1) dispersing a fraction of one or more smectite clays in an aqueous medium to form a dispersion,
and
in that the weight of the hormite clay content exceeds the weight of the smectite clay content in the combined clay slurry (c); and
subjecting the dispersions formed in (i.1) and (ii.1) to high speed fluid shear before carrying out step iii. and/or after having carried out step iii.

5. The process according to claim 4, wherein the weight of the fraction of one or more hormite clays (i) based on the total weight of the clays in the combined clay slurry is from 60 to 95 wt. %.

6. The process according to claim 4, wherein the weight of the fraction of one or more smectite clays (ii) based on the total weight of the clays in the combined clay slurry is from 5 to 40 wt. %.

7. The process according to claim 4, wherein the one or more smectite clays are selected from the group consisting of hectorites, montmorillonites, bentonites, beidelites, saponites, stevensites and mixtures thereof.

8. The process according to claim 7, wherein the smectite clay is selected from the group consisting of hectorites, saponites and mixtures thereof.

9. The process according to claim 4, wherein the quaternary alkyl-ammonium salt contains the same or different straight-chain or branched, saturated or unsaturated alkyl groups having 1 to 22 carbon atoms and the counter-ion moiety is selected from the group consisting of chloride, bromide, methylsulfate, nitrate, hydroxide, acetate, phosphate and mixtures thereof.

10. The process according to claim 9, wherein the quaternary alkyl-ammonium salt is selected from the group consisting of dimethyl di($C_{14-18}$ alkyl) ammonium chloride, methyl benzyl di($C_{14-18}$ alkyl) ammonium chloride, dimethyl benzyl $C_{14-18}$-alkyl ammonium chloride, dimethyl $C_{14-18}$-alkyl 2-ethylhexyl ammonium methylsulfate and mixtures thereof.

11. The process according to claim 4, wherein the mineral clay mixture is treated with about 5 to 80 mmol of the quaternary alkyl-ammonium salt per 100 g of clay in the combined clay slurry.

12. The process according to claim 4, wherein subsequently to step (i.1) the aqueous slurry (a) and subsequently to step (ii.1) the aqueous slurry (b) are screened through an at least 100 mesh screen (U.S. standard mesh) to remove coarse particles.

13. The process according to claim 4, wherein the aqueous slurry (a) and the aqueous slurry (b) are subjected to high speed fluid shear by passing the respective slurry or a mixture of the slurries through a narrow gap, across which a pressure differential is maintained.

14. A process comprising mixing the mixed mineral organoclay rheology additives as obtained by the process according to claim 4 in a composition as thickening agent.

15. The process according to claim 14, wherein the mixed mineral organoclay rheology additives are used as thickening agents in a liquid composition.

16. The process according to claim 15, wherein the liquid composition is a liquid organic composition.

17. The process according to claim 16, wherein the liquid organic composition is selected from the group consisting of coating materials, sealants, adhesives, oil drilling fluids, gas drilling fluids, composite materials, moulding compounds and liquid organic compositions which contain besides the mixed mineral organoclay rheology additive only one or more organic solvents.

18. The process according to claim 15, wherein the mixed mineral organoclay rheology additive is contained in an amount from 0.1 to 10 wt.-% based on the total weight of the liquid composition.

19. The process according to claim 1, comprising mixing at least one mixed mineral organoclay rheology additive, which consists of a quaternary alkyl-ammonium salt treated mineral clay mixture prepared by
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts
   v. separating the thus produced quaternary alkyl-ammonium salt treated mineral clay mixture from the aqueous medium,
   in which
   the aqueous hormite clay slurry (a) being formed by
      (i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$,
   and
   the aqueous smectite clay slurry (b) being formed by
      (ii.1) dispersing a fraction of one or more smectite clays in an aqueous medium to form a dispersion,
   and
   in that the weight of the hormite clay content exceeds the weight of the smectite clay content in the combined clay slurry (c); and subjecting the dispersions formed in (i.1) and (ii.1) to high speed fluid shear before carrying out step iii. and/or after having carried out step iii,
in a liquid composition comprising at least one epoxy resin.

20. The process according to claim 4 for producing a mixed mineral organoclay rheology additive, which consists of a quaternary alkyl-ammonium salt treated mineral clay mixture, the process being characterized by:
   i. forming an aqueous hormite clay slurry (a)
   ii. forming an aqueous smectite clay slurry (b)
   iii. combining the aqueous hormite clay slurry (a) with the aqueous smectite clay slurry (b) to form a combined clay slurry (c)
   iv. treating the combined clay slurry (c) with one or more quaternary alkyl-ammonium salts, and
   v. optionally separating the thus produced quaternary alkyl-ammonium salt treated mineral clay mixture from the aqueous medium,
   in which
   the aqueous hormite clay slurry (a) being formed by
      (i.1) dispersing a fraction of one or more hormite clays selected from the group of sepiolites and palygorskites in an aqueous medium to form a dispersion, and wherein the hormite clay fraction employed contains less than 3.0% by weight of $Al_2O_3$, less than 1.0% by weight of $Fe_2O_3$, and less than 3.5% by weight of the combination of $Al_2O_3$ and $Fe_2O_3$,
   and
   the aqueous smectite clay slurry (b) being formed by
      (ii.1) dispersing a fraction of one or more smectite clays in an aqueous medium to form a dispersion,
   and
   in that the weight of the hormite clay content exceeds the weight of the smectite clay content in the combined clay slurry (c); and
   subjecting the dispersions formed in (i.1) and (ii.1) to high speed fluid shear before carrying out step iii. and/or after having carried out step iii.

\* \* \* \* \*